Oct. 10, 1933.  S. C. COEY  1,929,410
CYCLONIC COOLING TOWER
Filed July 9, 1930  3 Sheets-Sheet 1
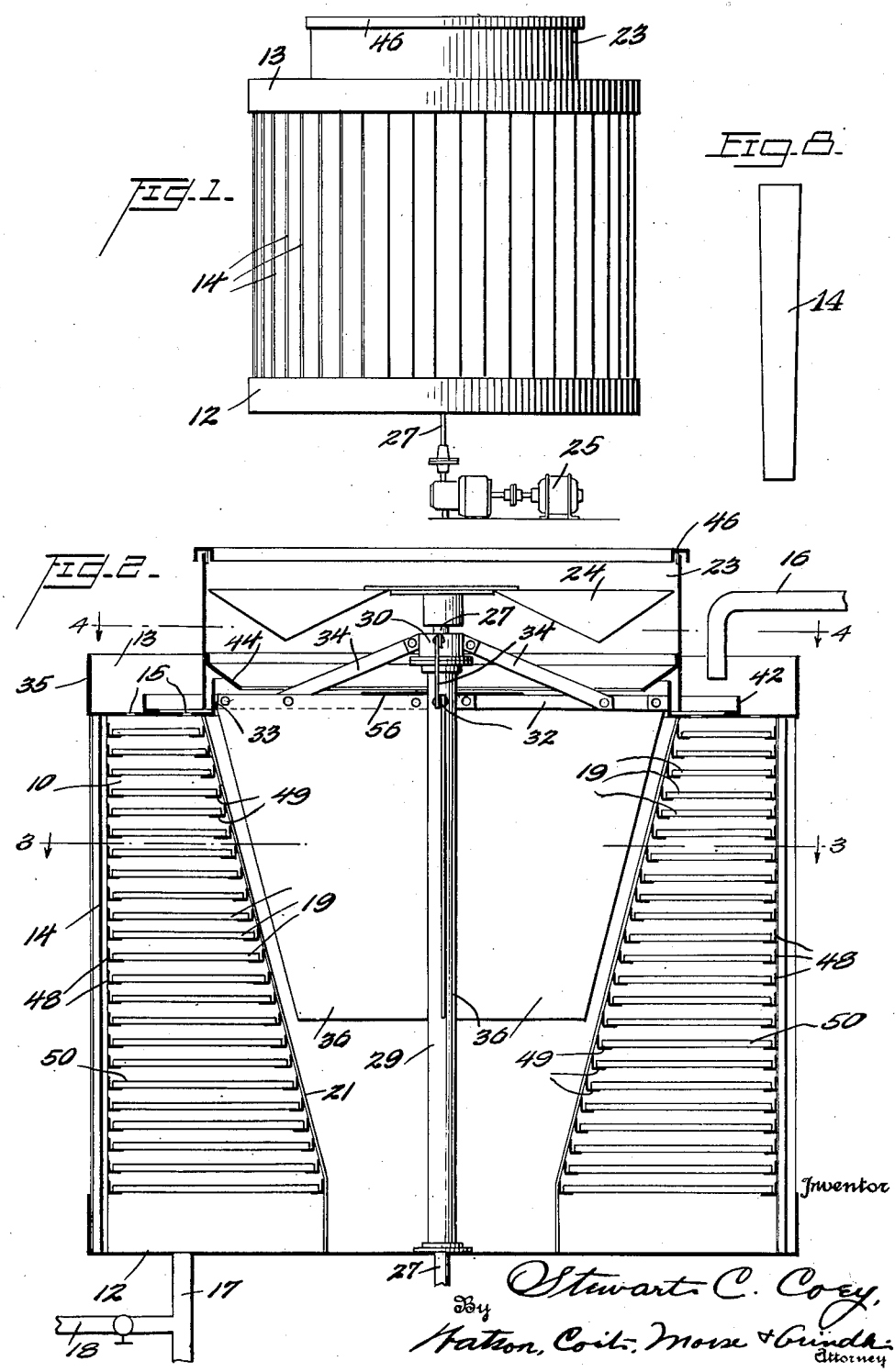

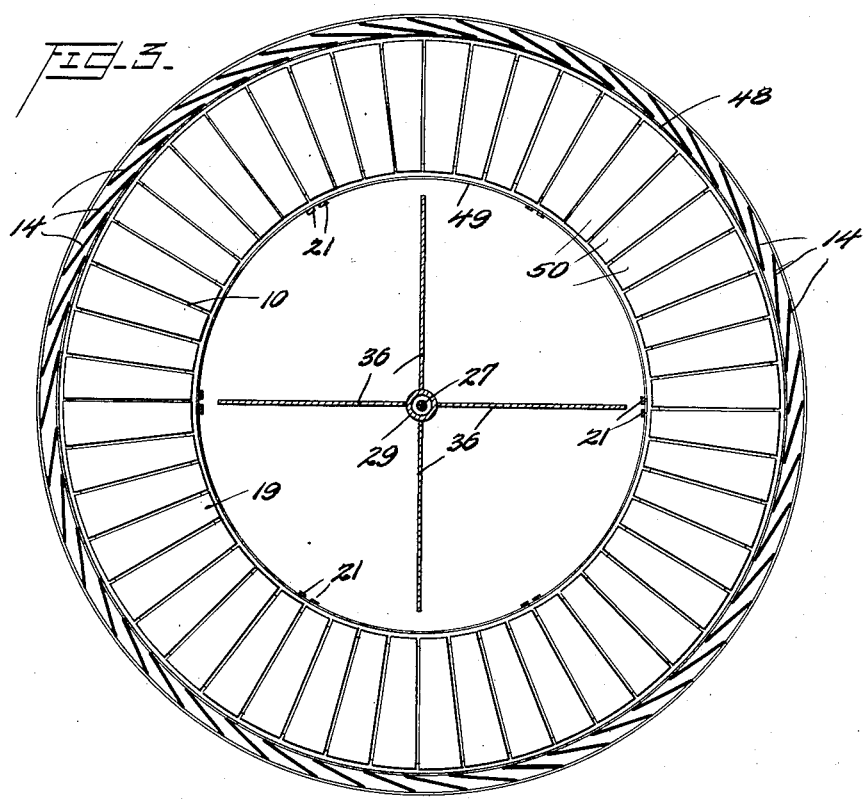
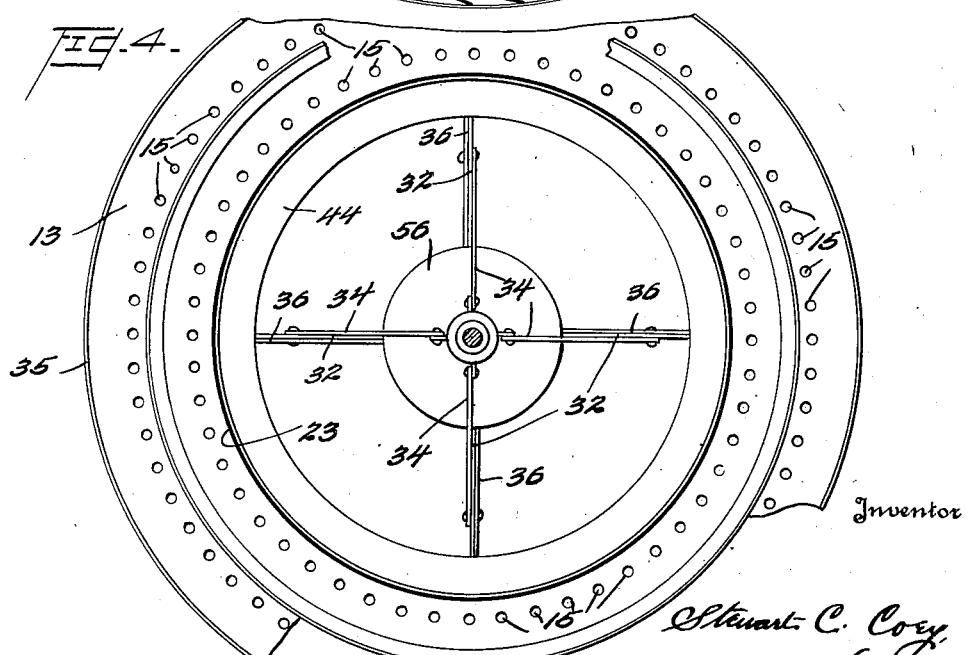

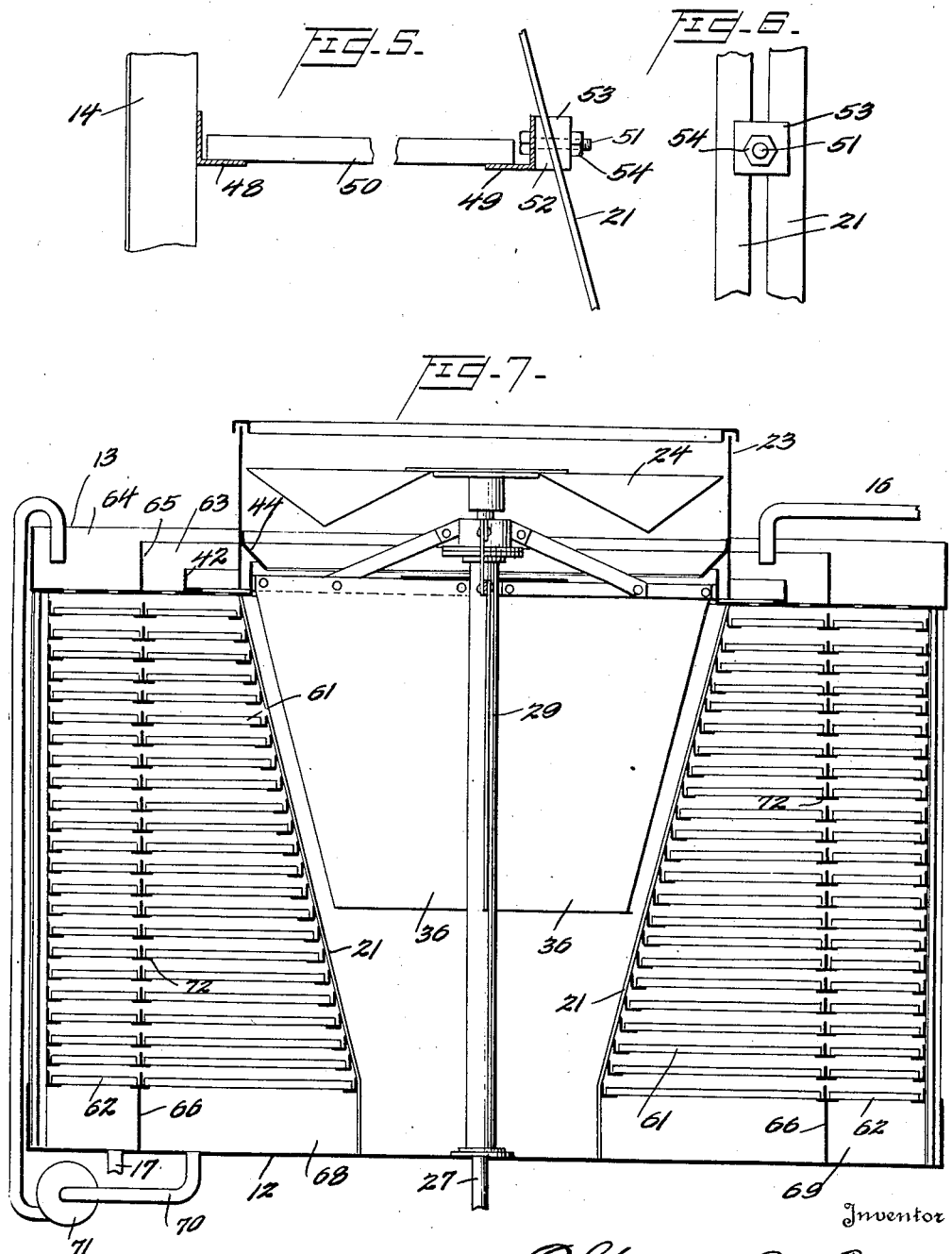

Patented Oct. 10, 1933

1,929,410

UNITED STATES PATENT OFFICE 1,929,410

CYCLONIC COOLING TOWER

Stewart Clark Coey, East Orange, N. J.

Application July 9, 1930. Serial No. 466,804

25 Claims. (Cl. 261—109)

This invention relates to apparatus for cooling liquid and more particularly to that type of cooling apparatus wherein liquid is cooled by contact with a current of air.

In the operation of refrigerating apparatus, a large quantity of water is constantly circulated through condensers or other cooling devices to lower the temperature of the refrigerating medium, such as sulphur dioxide. It has heretofore been the practice to extract this cooling water from the mains and to discharge the water into a waste pipe after the temperature of the water has been raised sufficiently to render it useless for further cooling. In recent years, however, these refrigerating systems have been constructed of such large capacity as to require the consumption of enormous amounts of cooling water, and serious depletion of the water supply has resulted. It has therefore been proposed to lower the temperature of the water heated by passage through the refrigerating system and to recirculate the same, so that water need be supplied only in such small amounts as is required to replace water evaporated during the cooling process and such other small amounts of water as are dispersed by losses incident to any liquid circulation system. It will be appreciated that such cooling apparatus requires very rapid circulation of the water and cooling air in order that large quantities of water may be cooled in a short time without the use of exceedingly large and bulky apparatus.

It is therefore the principal object of the present invention to provide a liquid cooling apparatus in which the size of the apparatus and consequently the space required for installation is relatively small as compared with the quantity of heat extracted from the water in a given time. The desired result is obtained in the present instnce by the adoption of the cyclonic principle of operation, that is to say, by imparting a circular motion of high velocity to the air in contact with the liquid to be cooled and withdrawing the moist and heated air along the axis of the circular path followed by the air.

Difficulty has been experienced in this type of apparatus as the result of the high velocity developed adjacent the center of the whirling body of air in the path of air discharge. For instance, it has been found that certain cooling apparatus employing the cyclonic principle in which the velocity of motion of the air at the periphery of the circular path is ten feet per second, the air develops a velocity of forty or fifty feet per second adjacent the axis about which the air is caused to rotate or whirl. This high central velocity in the path of air discharge results in the production of a water spout or geyser of water, the water being withdrawn from the cooling zone or from a collecting trough beneath the cooling zone and discharged with terrific force along the axis of circular motion. This difficulty can be overcome by reducing the velocity of the air, but it will be appreciated that any reduction of the speed of motion of the air will reduce the capacity of the apparatus. It is therefore a further object of the present invention to provide cooling apparatus of the type specified in which the amount of water discharged with the vented air is reduced to a minimum whereas the velocity of the air is limited only by the mechanical strength of the cooling apparatus.

In the embodiment of the invention illustrated in the drawings, this result is obtained by the provision of means for reducing the velocity of the air adjacent the axis of circular motion without materially reducing the velocity of the air in the circular path followed by the air in contracting with the liquid.

A further object of the invention is the provision of means for preventing the introduction of the circulating liquid into the path of the discharging air and for preventing the discharge of such liquid as may be introduced into the path of the vented air whenever an excess amount of liquid is supplied to the apparatus or whenever, for other reasons not incident to the normal operation of the apparatus, liquid may be introduced or sprayed into the discharging air.

A further object of the invention is the construction of an apparatus of the type described in such manner as to provide the maximum of contact at a high velocity between the air and liquid with a minimum expenditure of power.

A further object of the invention is the provision of apparatus suitable for use in a continuous cooling system for efficiently reducing the temperature of water circulated in the system and particularly applicable in connection with the cooling of theaters, auditoria, restaurants, and for the cooling of the water of Diesel engines and other power plants. When applied to these and similar purposes the water may be cooled in advance of use and then discharged as waste, but preferably the water is recirculated and additional water is introduced into the system sufficient only to replace such water as is lost by evaporation, leakage and other small losses.

Further objects and features of the invention will be apparent from the following description taken in connection with the accompanying drawings, in which:

Figure 1 is an elevational view of one form of apparatus illustrating the principles of the present invention;

Figure 2 is a vertical sectional view of the apparatus shown in Figure 1;

Figure 3 is a section on the line 3—3 of Figure 2;

Figure 4 is a section on the line 4—4 of Figure 2;

Figure 5 is an enlarged fragmentary sectional view illustrating certain details of the construction shown in Figure 2;

Figure 6 is an elevational view of the constructional details shown in Figure 5;

Figure 7 is a vertical sectional view illustrating a modified form of the invention and Figure 8 is an elevational view of one of the elements shown in Figure 1.

Referring now to Figures 1 to 6 of the drawings, it will be seen that the apparatus takes the form of a cylindrical chamber into which the water or other liquid and air are introduced, it being understood that the shape and dimensions of this chamber are not material, although it has been found in general that the cylindrical form of chamber or tower is best adapted to the production and maintenance of a circularly moving air stream. The water or other liquid to be cooled is preferably introduced at the top of the chamber adjacent the periphery, is showered down through the chamber, and after the temperature has been sufficiently reduced, is drawn off at the lower end of the chamber. The air enters the chamber peripherally thereof, preferably in a tangential direction, and follows a circular path through the falling water, being eventually discharged along the axis of the chamber and preferably in an upward direction.

In the drawings, the chamber is indicated generally by the reference numeral 10 and comprises a base 12 in the form of a basin for receiving the cooled water or other liquid, an annular trough 13 at the upper end of the chamber for the reception of water to be cooled, and vanes 14 extending between the base and the receiving trough 13 and constituting the peripheral wall of the chamber, these vanes being preferably arranged as shown in Figure 3 to form louvers through which air may be admitted in a direction substantially tangentially of the chamber 10. An inlet pipe 16 for the heated water discharges into the trough 13 at the upper end of the chamber and the base 12 of the chamber is provided with a discharge outlet 17 through which the cooled water may be withdrawn. A valve controlled pipe 18 is preferably connected with the discharge outlet 17 for the purpose of introducing liquid into the system, and when a closed circulating system is used, liquid is introduced through the pipe 18 only in an amount sufficient to replace such liquid as is lost by evaporation and leakage. It will be understood that in the application of the apparatus to a closed cooling system the liquid from the discharge outlet 17 is conveyed to the place of use and is returned at a substantially higher temperature and delivered through the inlet pipe 16 into the trough 13. A series of annular trays 19, described more in detail hereinafter, are disposed within the chamber and about the periphery thereof, these trays being supported adjacent their outer circumference on the vanes 14 and adjacent their inner circumference on suitable supporting elements 21 extending between and preferably secured to the base 12 and the trough 13. Appertures 15 are provided in the base of the trough 13 and in each of the superimposed trays, so that water introduced into the trough is showered down through the succesive trays and is finally discharged through the outlet 17 in the base of the chamber.

A fan casing 23 disposed centrally of the chamber and preferably at the upper end thereof encloses a fan 24 which serves to draw air through the vanes 14 about the periphery of the chamber, across the trays in intimate contact with the falling liquid, and upwardly through the central portion of the chamber, the air being exhausted through the casing 23. The fan 24 is preferably driven by a motor 25 located beneath the chamber, a shaft 27 on which the fan is mounted serving to connect the motor and fan, although it will be understood that the motor may be located above the chamber and adjacent the fan if desired. A tubular housing 29 extends upwardly along the axis of the chamber and serves to encase the fan shaft 27, a suitable bearing 30 for the fan shaft being provided at the upper end of the housing. Adjacent its upper end, the fan shaft housing 29 is supported by horizontally extending stays 32 disposed between the housing and the annular inner wall 33 of the trough 13. Supporting stays 34 may also be provided between the stays 32 and the fan shaft bearing 30 to ensure accurate alignment of the fan shaft with the chamber axis.

As pointed out hereinabove, circular motion of the air is induced by the fan and the tangential arrangement of the louvers 14 to cause the air to pass rapidly over the trays 19 and in intimate contact with the falling water. The velocity of this circular motion increases toward the central axis of the chamber so that there is a tendency to draw water from the base 12 upwardly through the chamber and discharge the same, together with the vented air, in the form of a water spout or geyser. Furthermore, the tremendous velocity of the air frequently effects withdrawal of the falling water and discharge thereof in the form of spray. The improvements in the present invention are directed principally to the reduction of the amount of water so withdrawn and are particularly directed to the provision of means for reducing the velocity of the air in the path of discharge and adjacent the axis of the chamber. In the preferred form of the invention this means comprises a plurality of baffles 36, extending radially of the chamber, and secured to the tubular housing 29, these baffles being preferably strengthened by attachment to the stays 32 adjacent the upper end of the chamber. It has been found that this arrangement effectively reduces or prevents circular motion of the air adjacent the axis of the chamber and thereby prevents the withdrawal of water or spray with the discharged air.

The fan casing 23 extends at its lower end into the trough 13 beneath the upper edge of the annular wall 33 which constitutes the inner circumference of the trough. In this way the casing 23 and wall 33 form an effective water seal to prevent air from entering the fan casing and chamber, and since the wall 33 is of less depth than the outer wall 35 of the trough, excess water is permitted to spill over the wall 33 into the chamber 10 and is thereby retained in the circulating system.

Apparatus of this type is frequently used under such circumstances that the amount of water handled during any given period of time is subject to considerable variation. It has been found that when the flow of water through the inlet pipe 16 is sufficiently reduced, the water falls through the apertures in the base of the trough 18 without completely surrounding the trough so that the distribution of falling water around the periphery of the chamber is not uniform and, by reason of this insufficient depth of water in the trough, the water seal between the trough and the chamber cannot be effectively maintained. On the other hand, when an excessive amount of water is being handled, the trough apertures 15 are not sufficiently large to permit the passage of water through the same and downwardly on the trays 19, and the excess water flows over the inner wall 33 of the trough and is carried out with the ascending discharged air. In order to increase the flexibility of the system and to make it possible to handle water in largely varying amounts, the following construction is preferred.

An annular flange 42 is secured within the base of the trough intermediate the inner and outer circumferences thereof, this flange being of less depth than the inner wall 33 of the trough. By arranging the discharge end of the inlet pipe intermediate the inner wall 33 on the trough and the flange 42, a small supply of water may be caused to flow completely around the trough and uniform distribution thereby secured. As the water supply increases, the water overflows the flange 42 and falls through the apertures provided about the trough and intermediate the flange 42 and the outer wall of the trough so that the proper distribution of water is ensured regardless of the amount of the supply.

It will be observed that the disposition of the inlet pipe 16 is such as to ensure an effective seal at this point even though a comparatively small amount of water is being delivered to the apparatus, since only that area of the base of the trough included between the wall 33 and flange 42 need be covered with water to prevent entry of air into the casing. If desired, the pipe 16 may be so positioned that only such portion of the water as is required to maintain the water seal is introduced between the flange 42 and the inner wall 33, the remainder of the supply water being delivered to the outer portion of the trough 13.

When a very heavy demand is made on the apparatus and the water supply is in excess of that which may be carried off by the apertures in the base of the trough 13, the excess water will spill over the inner wall 33 of the trough as hereinbefore pointed out. To prevent the withdrawal of this overflow together with the discharged air, an annular flange 44, preferably cylindrical or conical in shape as shown in Figure 2 of the drawings, is secured to the inner wall of the fan casing 23 and extends over the inner wall 33 of the trough. With this arrangement, any excess water flowing into the central portion of the chamber tends to fall directly downward and is prevented from withdrawal with the ascending column of air.

An annular member 46 is preferably provided at the upper end of the fan casing 23, this member being substantially U-shaped in cross section with the base disposed above the fan casing and the legs extending downwardly on either side of the casing, as shown in Figure 2. Any water or spray arising with the air will be deflected by the member 46 around the upper end of the fan casing 23 and will fall back into the receiving trough 13. It will be appreciated that the action of the member just described in diverting the spray of water is assisted by the centrifugal force acting on the heavier particles of water which tends to cause these particles to follow the fan casing wall rather than to ascend along the axis of the chamber.

The trays 19 may consist of perforated annular or sector-shaped baffles or may assume any conventional form calculated to retard the downward movement of the liquid. A preferred construction is illustrated in the drawings and comprises a plurality of sector-shaped plates 50 supported by annular members 48 and 49, preferably L-shaped, and carried by the louvers 14 and the supporting elements 21 respectively. The adjacent plates are spaced slightly as indicated in the drawings to permit the water to fall therebetween.

It will be appreciated that the incoming air is moving not only in a circular path, but is constantly crowded in toward the center of the chamber, this action being produced by the draft from the fan. This constant inward movement of the air tends to move such water as falls on the trays 19 inwardly of the chamber and spilling of the water from the trays into the central portion of the chamber is prevented by the annular vertically disposed leg of the L-shaped member 49. It is also found advisable to tilt the trays by supporting the inner circumference of each tray slightly above the outer circumference thereof to further counteract the effect of the inwardly moving air on the water temporarily retained on the trays. The exact degree of inclination can best be determined during actual operation of the apparatus and it is therefore desirable to provide some means of adjusting the members 48 and 49 with respect to each other in a vertical direction. One such arrangement for effecting adjustment is indicated in Figures 5 and 6 of the drawings, from which it will be noted that the supporting elements 21 are arranged in pairs circumferentially of and about the chamber, the elements in each pair being spaced slightly to permit the introduction of a bolt 51 therebetween. Each bolt 51 also passes through the vertical leg of the corresponding L-shaped member 49 and through apertures in a pair of wedge-shaped clamping elements 52 and 53. A nut 54 is threaded on the outer end of each bolt 51 and it will be observed that this construction permits the members 49 to be moved up and down on the supporting elements 21 and securely retained in position by tightening the nuts 54 to clamp the wedge-shaped elements 52 against the faces of the corresponding supporting elements 21.

The amount of spray discharged with the vented air may be furthermore reduced, if necessary, by the provision of a substantially circular disk 56 which is secured to the stays 32 and surrounds the fan shaft housing 29. It has been found that the best results are obtained when the diameter of this disk is substantially one third of the diameter of the fan.

The movement of the air in the direction of discharge is assisted materially by the action of centrifugal force resulting from the circular motion imparted to the incoming air. The air which has become warm and humid by passage through the liquid is lighter than the cooler dry air introduced through the louvers, and the heavier air tends to remain near the periphery of the chamber so that a natural draft is formed which assists the fan materially in effecting introduction and discharge of the air. When these factors are taken into consideration, it is found that the best results are obtained when the interior diameter of the lowest tray is substantially one half the diameter of the fan, there being obviously a greater volume of air passing in the direction of discharge through the upper portion of the chamber than through the lower portion. It will furthermore be noted that the trays 19 should be spaced further apart toward the lower end of the chamber and the louvers are also preferably arranged so as to admit the air more freely at the lower end of the chamber than at the upper end. The proper spacing of the louvers can best be obtained by constructing the louvres of greater width at the top than at the bottom as shown in Figure 8 of the drawings, so that adjacent louvers overlap to a greater extent at the upper end of the chamber. In this manner the resistance offered to the passage of air entering near the lower end of the chamber by reason of the greater length of the path followed is materially reduced and approximately the same volume of air may be caused to pass between each pair of adjacent trays whereby a more uniform and intimate mixing of the air and liquid is obtained.

In the modified form of the invention disclosed in Figure 7 of the drawings, the principal constructional details are identical with those already described, but provision is made for recirculating the liquid so as to increase the capacity of the cooling air to absorb heat from the falling liquid. It will be noted that a plurality of series of annular trays are provided, the trays 61 in the inner series being preferably co-planar with the trays 62 in the outer series. An annular flange 65 divides the trough 13 into two annular compartments 63 and 64, one compartment being disposed over each series of trays. The inlet pipe 16 is arranged to discharge water into the inner compartment 63 and the water passes downwardly through the trays 61 to the base 12 in the usual manner.

A second annular flange 66 serves to divide the base 12 of the chamber into two similar compartments 68 and 69, one disposed beneath each series of trays. The partially cooled water received in the compartment 68 is returned by means of a conduit 70 provided with a suitable pump 71 to the outer compartment 64 in the trough 13 and is discharged downwardly over the trays 62 into the outer compartment 69 in the base 12 of the chamber, from which it is removed through the outlet 17.

It will be appreciated that where a single series of trays only is provided, as in the form of the invention first described, the temperature of the water passing through the lower trays under certain conditions of operation approaches somewhat closely to the wet bulb temperature of the incoming air so that the amount of heat which can be removed from the falling water in the lower portion of the chamber is fairly low. In the modified form of the invention shown in Figure 7, however, only that portion of the falling water which is passing through the lower trays 62 of the outer series has been reduced to a temperature approaching that of the wet bulb temperature of the cooling air, the temperature of the water falling through the lower trays 61 of the inner series being intermediate the water temperatures at the points of introduction and discharge and being considerably greater than the wet bulb temperature of the air so that the maximum amount of heat is extracted from the water. This modified form of the invention may be used either to increase the amount of water handled in a given time between given temperatures or to increase the range of temperature over which the apparatus will operate. It is obvious that this modified arrangement may be extended by the provision of any number of additional series of trays for repeated recirculation of the water. It will be noted that while the air may become saturated in passing through the water in the outer section, the air temperature is raised by passage through the inner section so that use is made of the increased moisture absorbing capacity of the air at the higher temperature.

Suitable supports 72 may, of course, be provided intermediate the series of trays, and the flanges 42, hereinbefore described, may be applied to the inner compartment 63 of the trough 13 for the purpose of maintaining the water seal at the junction of the trough 13 and the fan casing 23.

Specific reference is made in the foregoing description to the use of the apparatus for contacting water and air for the purpose of reducing the water temperature, but it will be understood that the structure described herein is useful in carrying out various processes involving intimate association of liquid and gaseous matter aside from heat transfer processes, for instance, in effecting chemical combinations of liquids and gases, washing and scrubbing gases, or humidifying air.

While the invention has been described with reference to the specific embodiments shown in the drawings, it will be appreciated that various alterations may be made as to form and shape of the component parts of the apparatus and that all such changes are contemplated as fall within the spirit and scope of the appended claims.

Having thus described the invention, what is claimed as new and desired to be secured by Letters Patent is:

1. In a heat exchange apparatus, the combination with a substantially cylindrical vertically disposed chamber, of means for causing air to enter the periphery of the chamber and be discharged along the chamber axis, a series of superimposed annular trays disposed adjacent the chamber periphery, said trays having openings therein to permit passage of liquid, and separate means relatively movable vertically for supporting the inner and outer circumferences of the trays, whereby the latter may be inclined downwardly toward the center of the chamber to the extent required to overcome the action of the inwardly moving air on the liquid supported on the trays.

2. In a heat exchange apparatus, the combination with a substantially cylindrical, vertically disposed chamber, of a series of superimposed annular trays supported within said chamber and about the periphery thereof, each tray consisting of a plurality of sector shaped plates spaced to permit passage of liquid therebetween, means for introducing liquid on the uppermost tray, and a support for the inner circumferential portion of each tray comprising an annular member having a flange projecting above the upper surface of the plates to prevent spilling of the liquid.

3. In heat exchange apparatus of the type wherein liquid is showered downwardly through a current of air to effect intimate contact between the air and the liquid, the combination with means for discharging liquid through the moving air, of means for obstructing the fall of the discharged liquid, said last named means comprising a pair of annular elements of different diameter, means for supporting said elements in substantially the same horizontal plane with the element of larger diameter surrounding the element of smaller diameter, and a plurality of sector shaped plates extending between said elements to form an annular tray, said plates being spaced slightly to permit liquid to fall therebetween.

4. In heat exchange apparatus of the type wherein liquid is showered downwardly through a current of air to effect intimate contact between the air and the liquid, the combination with means for discharging liquid through the moving air, of means for obstructing the fall of the discharged liquid, said last named means comprising a pair of annular elements of different diameter, means for supporting said elements in substantially the same horizontal plane with the element of larger diameter surrounding the element of smaller diameter, a plurality of sector shaped plates extending between said elements to form an annular tray, said plates being spaced slightly to permit liquid to fall therebetween, said supporting means being adjustable vertically to permit elevation of one of said elements above the other to prevent spilling of liquid by the action of air currents moving radially of the tray.

5. In air and liquid contact apparatus, the combination with a continuous trough adapted to receive liquid, said trough having openings therein to permit discharge of liquid, and having inner and outer walls, of a partition within said trough of less height than the inner wall of the trough forming inner and outer compartments, a casing through which air may be circulated, said casing surrounding the inner wall of said trough and depending into the said inner compartment to a point beneath the normal level of water in the trough to form a liquid seal for said casing, and means for introducing liquid into the inner compartment of said trough whereby the said partition will effectively maintain the liquid seal under conditions of low liquid supply.

6. In air and liquid contact apparatus, the combination with an annular trough adapted to receive liquid and having inner and outer walls, of a partition within said trough of less height than the inner wall of the trough forming inner and outer compartments, an annular casing for the circulation of air, said casing being of larger diameter than the inner wall of the trough and depending into said inner compartment to a point beneath the normal level of liquid in the trough to form a liquid seal for said casing, said trough having openings in both compartments to permit discharge of liquid therefrom, and means for introducing liquid into the inner compartment of said trough whereby the said partition will effectively maintain the liquid seal under conditions of low liquid supply.

7. In air and liquid contact apparatus, the combination with a continuous trough adapted to receive liquid, said trough having openings therein for discharging the liquid, of a casing surrounding the inner wall of said trough and depending into the trough to a point beneath the normal liquid level to form a liquid seal for the casing, means for causing air to pass through the liquid discharged from the trough and to pass upwardly through said casing, and means associated with said casing and extending into the path of air passing therethrough for deflecting into said trough a portion of such liquid as may be carried with the moving air.

8. In air and liquid contact apparatus, the combination with a continuous trough adapted to receive liquid, said trough having openings therein for discharging the liquid, of a casing surrounding the inner wall of said trough and depending into the trough to a point beneath the normal liquid level to form a liquid seal for the casing, means for causing air to pass through the liquid discharged from the trough and to pass upwardly through said casing, and means associated with said casing and extending into the path of air passing therethrough for deflecting into said trough a portion of such liquid as may be carried with the moving air, said last named means including a member spaced from the upper end of said casing and extending downwardly on either side thereof.

9. In air and liquid contact apparatus, the combination with a continuous trough adapted to receive liquid, said trough having openings therein for discharging the liquid, of a casing surrounding the inner wall of said trough and depending into the trough to a point beneath the normal liquid level to form a liquid seal for the casing, means for causing air to pass through the liquid discharged from the trough and to pass upwardly through said casing, and means tending to prevent withdrawal with the air moving through the casing of liquid overflowing the inner wall of the trough.

10. In air and liquid contact apparatus, the combination with a continuous trough adapted to receive liquid, said trough having openings therein for discharging the liquid, of a casing surrounding the inner wall of said trough and depending into the trough to a point beneath the normal liquid level to form a liquid seal for the casing, means for causing air to pass through the liquid discharged from the trough and to pass upwardly through said casing, and means tending to prevent withdrawal with the air moving through the casing of liquid overflowing the inner wall of the trough, said last named means comprising a baffle plate secured to the interior of the casing and extending over and within the inner wall of the trough.

11. In a cooling tower for liquid, the combination with a chamber, means for circulating liquid within the chamber, and means for causing air to enter said chamber and be discharged from one end thereof, the wall of said chamber being provided with a plurality of openings to admit air, said openings being so formed and disposed as to admit the air more freely to that portion of the chamber remote from the point of air discharge.

12. In a cooling tower for liquid, the combination with a chamber having an air outlet adjacent one end thereof and having a wall comprising a plurality of longitudinally extending plates spaced to permit entry of air therebetween, of means for circulating liquid within said chamber, and means disposed adjacent the air outlet end of the chamber for causing introduction and discharge of air, the free space between the plates being greater at that end of the chamber remote from the air outlet.

13. In a cooling tower for liquid, the combination with a substantially cylindrical chamber having the walls thereof formed of longitudinally extending plates constituting louvers, means for circulating liquid within the chamber, and means for causing air to enter said louvers, contact with the liquid and be discharged from one end of the chamber, said plates being of greater width at the discharge end of the chamber whereby less resistance to the incoming air will be offered by the louvers at that end of the chamber remote from the discharge end.

14. In apparatus for cooling liquid, the combination with a chamber, of means for introducing relatively cool air through the periphery of the chamber and discharging the same longitudinally of the chamber, means for showering at its maximum temperature, liquid to be cooled longitudinally of the chamber adjacent the central portion thereof through partially heated air, and means for returning the liquid thus partially cooled and showering the same longitudinally of the chamber and adjacent the periphery thereof through the relatively cool air.

15. In apparatus for cooling liquid, the combination with a substantially cylindrical, vertically disposed chamber arranged to permit passage of liquid therethrough in a downward direction, of means for causing a current of air to enter the chamber tangentially thereof, to pursue a substantially circular path adjacent the periphery of the chamber and in contact with the liquid, and to pass upwardly through the central portion of the chamber, means for discharging liquid downwardly through said chamber and adjacent the central portion thereof, and means for returning the liquid and discharging the same downwardly adjacent the periphery of the chamber.

16. In a heat exchange apparatus, the combination with a substantially cylindrical chamber, of means for causing air to enter the periphery of the chamber and to be discharged axially thereof, a series of superimposed annular trays having openings therein for the passage of liquid disposed adjacent the chamber periphery, a second series of superimposed annular trays disposed within the confines of said first named trays and substantially coplanar therewith, and means for discharging liquid on the uppermost tray of the inner series, withdrawing the liquid at the lower end of the inner series of trays and discharging the same on the uppermost tray of the outer series of trays.

17. In the art of contacting gas and liquid, the method which comprises passing liquid particles through a stream of gas whirling about an axial zone, collecting in a pool extending within the axial zone the liquid particles so passed, and continuing passage of said gas through said axial zone, in an upward direction away from said pool, with a movement whose rotary component has been reduced to a magnitude substantially preventing transport of liquid from said pool.

18. In the art of contacting gas and liquid, the method which comprises forcibly drawing gas upwardly through an axial zone, directing the flow of gas to said zone to effect a whirl thereof, passing liquid particles through the whirling gas and collecting them in a pool contacting with gas in the axial zone, and in said axial zone reducing the whirl of the gas to a degree substantially preventing transport of liquid from said pool.

19. A method of effecting interchange of heat between a gas and liquid, which comprises whirling gas about an axial zone, passing liquid particles through the whirling gas in a contact zone and collecting the particles in a pool, withdrawing liquid from said pool and passing it in particles through the whirling gas in a zone displaced from the contact zone through which said first named particles pass, and continuing the passage of the gas through said axial zone.

20. A method of effecting interchange of heat between a liquid and gas, which comprises whirling the gas about an axial zone, passing the liquid in particles through the whirling gas, collecting the liquid particles in a pool extending within the axial zone, withdrawing liquid from said pool, passing it in particles transversely through said gas, continuing passage of the gas through said axial zone and beyond said axial zone continuing the rotation of the gas at an angular velocity sufficient to separate entrained liquid therefrom, and returning the liquid so separated to said pool.

21. Apparatus for effecting contact between liquid and gas, comprising a chamber having an opening adjacent the top thereof, power driven means for effecting movement of the gas upwardly through an axial zone in said chamber, said chamber having vertically extending peripheral openings whose widths increase downwardly through which gas enters tangentially into said chamber to effect a whirl, a plurality of substantially horizontal members vertically spaced from each other within said chamber forming gas passages through which the gas whirls in its passage towards said axial zone, said members being adapted to pass liquid in subdivision downwardly transversely of said passages, the cross sectional areas and the radial lengths of said passages being the greater as their distance from the top of said chamber is the greater.

22. Apparatus for effecting contact between liquid and gas, comprising a chamber having an opening adjacent the top thereof, power driven means for effecting movement of the gas upwardly through an axial zone in said chamber, said chamber having vertically extending peripheral openings whose widths increase downwardly through which gas enters tangentially into said chamber to effect a whirl, a plurality of substantially horizontal members vertically spaced from each other within said chamber forming gas passages through which the gas whirls in its passage towards said axial zone, said members adapted to pass liquid in particles downwardly transversely of said passages, the cross sectional areas and the radial lengths of said passages being the greater as their distance from the top of said chamber is the greater, means collecting said particles in a pool, and means within said axial zone for reducing the rotary component of movement of the gas through said axial zone to a magnitude such as substantially to prevent transport of liquid from said pool.

23. In a cooling tower for liquid, of the type wherein the liquid passing through the tower is contacted by a current of air flowing into and out of the tower, the combination with means for causing air to enter the tower laterally, follow a substantially circular path about the longitudinal axis of the tower and be discharged upwardly adjacent the said longitudinal axis, of a reservoir at the lower end the the tower for collecting the cooled liquid, said reservoir being opened to the interior of the tower to afford access thereto, and means disposed in the path of the discharging air for reducing the velocity of circular motion thereof to the extent required to prevent withdrawal of liquid from the reservoir by the action of the moving air.

24. In apparatus for cooling liquid, the combination with a substantially cylindrical, vertically disposed chamber arranged to permit passage of liquid therethrough in a downward direction and adjacent the periphery of the chamber, of means for causing a current of air to enter the chamber tangentially thereof, to pursue a substantially circular path adjacent the periphery of the chamber and in contact with the liquid, and to pass upwardly through the central portion of the chamber, a storage basin extending across the lower end of the chamber and extending within the central portion of the chamber for receiving the cooled liquid, and means for obstructing the motion of the air in a circular path in the central portion of the chamber to prevent withdrawal of liquid from said basin.

25. In a cooling tower for liquid, of the type wherein the liquid passed through the tower is contacted by a current of air flowing into and out of the tower, the combination with means for producing a whirling motion of the air within the tower about a central zone and for venting the air upwardly through said central zone, of means for showering liquid downwardly through the whirling air, a basin disposed at the lower end of the tower and open to the interior of the tower and extending substantially across the said axial zone for collecting the cooled liquid, and means disposed within the tower for reducing the velocity of whirling motion of the air within the central zone for preventing withdrawal of liquid from the basin with the vented air.

STEWART CLARK COEY.